Figure 1:
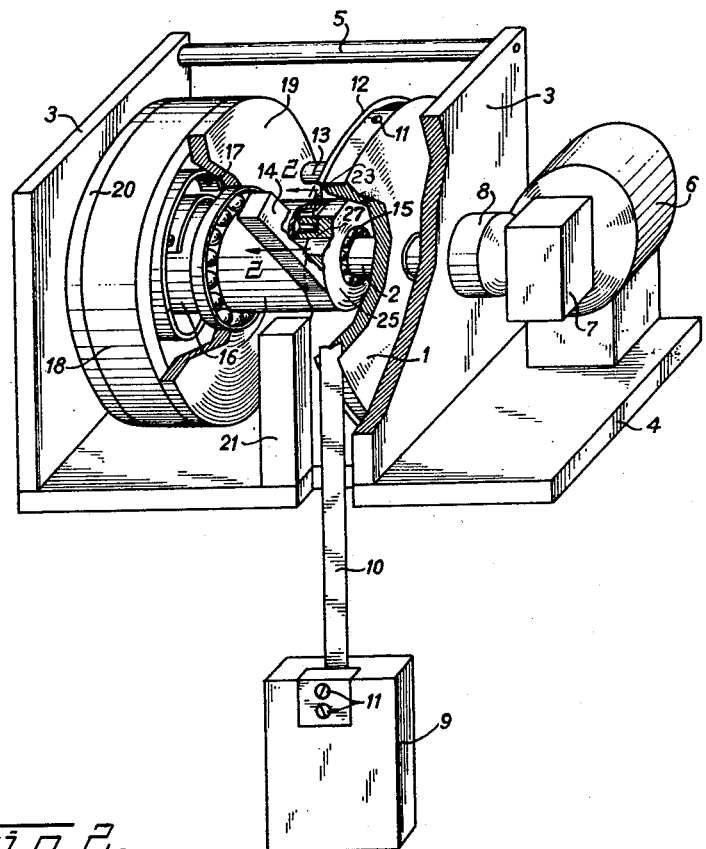

Jan. 5, 1965  P. GIRARD  3,164,526
REEL TYPE CONTROL ROD BRAKE
Filed Nov. 22, 1961

INVENTOR
PIERRE GIRARD
BY
Bacon & Thomas
ATTORNEYS

United States Patent Office 3,164,526
Patented Jan. 5, 1965

3,164,526
REEL TYPE CONTROL ROD BRAKE
Pierre Girard, Saint-Gratien, France, assignor to Commissariat a l'Energie Atomique, Paris, France
Filed Nov. 22, 1961, Ser. No. 154,275
Claims priority, application France, Dec. 6, 1960, 846,065/60
8 Claims. (Cl. 176—36)

The present invention relates to a device for the transmission of kinetic energy at the time of instantaneous stopping of a body in movement, for example of the type which provides a means of effecting the slowing-down and then the stopping of a winch.

The invention more especially applies, although not exclusively, to the operation of devices of this type which are employed for the operation of the safety rods of an atomic reactor so as to ensure their stoppage in as short a time as possible and in a predetermined position without either overshooting or rebounding.

It is in fact known that it must be made possible at every moment to contemplate the very rapid falling or placing in position of the said rods or absorber elements in the position which corresponds to their most effective use. Accordingly, in view of the fact that the efficiency curve as a function of the position is usually not linear but increases rapidly in the last portions of travel, it is therefore important to ensure that the speed at which the elements travel over the said last portions is both as high as possible and compatible also with the slowing-down or braking action which permits the said elements to stop in their most suitable position.

It will consequently be understood that certain difficulties are encountered in the construction of the device which carries out the above-mentioned function, taking into account in particular the various conditions of pressure, temperature and radioactivity.

The purpose of the present invention is to satisfy the foregoing conditions while appreciably reducing the technological difficulties which usually arise therefrom.

The invention has for its object a device for the transmission of kinetic energy at the time of instantaneous stopping of a body in movement, characterized in that it comprises a drum which is rigidly fixed to a rotary shaft and on which is wound a flexible tie secured on the one hand at one extremity thereof to the said drum and on the other hand at the other extremity thereof to the said body, a pin integral with the said drum and capable during a part of its movement of actuating a lever which rotates freely about the said rotary shaft, a fixed stop against which the said pin comes to rest at the end of its travel, a free-wheel mechanism mounted inside a housing actuated by the said lever and an elastic coupling which is secured on the one hand to the said housing and on the other hand to an inertia flywheel in such manner that the kinetic energy of the said body at the moment when the said pin comes into contact with the said stop is wholly and non-reversibly transmitted to the said flywheel by means of the said elastic coupling and the said free-wheel mechanism.

Apart from this principal arrangement, the device which forms the subject of the invention consists in certain secondary arrangements which can be employed either separately or preferably at the same time and in particular:

The said rotary shaft is coupled to a reduction-gear motor set through the intermediary of an electromagnetic clutch designed to be operated from a distance;

The said lever, after stoppage of the pin which controls the movement thereof, is restored to a suitable position by means of a device which applies to the said lever a low couple in the direction opposite to that which is imparted to it by the drum.

In addition and in accordance with a preferred form of embodiment of the invention, the elastic coupling is constituted by a coil spring and the inertia flywheel by a felloe supported by two end-shields, the thickness of which is limited so as to provide between them the space which is necessary for housing the said spring.

The transfer of the total kinetic energy of the element or body in movement to an auxiliary member is thus carried into effect during a period of time which can be just as brief as the mechanical resistance of the various parts of the device will permit. The slowing-down and then the stopping of the auxiliary member is subsequently produced within a space of time which can be made to vary within wide limits by any desired means which only employ low power.

The device in accordance with the invention in fact provides a means of effecting, in the particular case of the control of the absorber elements of a nuclear reactor, the suitable placing in position of the said elements in a very short time with a braking period which is also very brief. Thus, by way of example, for a total period of time of 0.5 second, the braking takes place in a time which is preferably less than 0.05 second approximately for a kinetic energy to be absorbed which can exceed several kilogrammetres, the instantaneous power being thus capable of reaching, even in the case of low-power reactors, a value of several hundreds of watts. The braking device must additionally bring the elements into the most effective position without impact or with very slight impact, irrespective of the causes which can produce a variation in their speed at the moment of commencement of the braking action, such as for example friction losses or differences in the starting distances. To this end, the effectiveness of the device is dependent on the speed of the elements from the time of initial braking or is more generally limited in time so as to provide the means, after stoppage at any level, for ensuring the rapid return of the absorber elements to a position of safety, that is to say to a position of maximum effectiveness.

The device is therefore capable of operating in both a reliable and accurate manner when no source of external energy is present; and moreover, being put to practical effect by means of members which are as little subject as possible to deformations and to wear, the device remains faithful in spite of particularly limited possibilities of maintenance.

Finally the device is designed to be set to work in the same manner, both in the case of a rectilinear displacement of the element to be braked as well as in the case of a circular movement.

Figure 2:
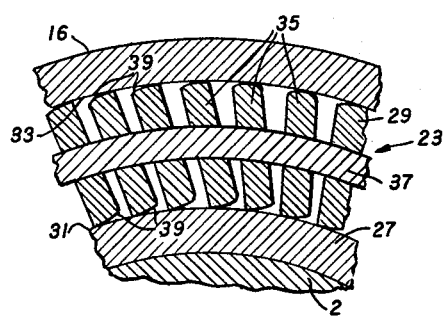

Further advantages and characteristic features of the invention will in any case be brought out more clearly by a description of one example of embodiment, reference being made therein to FIGURE 1 of the accompanying drawings which illustrates a diagrammatic view, partly broken away, taken in perspective of a winch fitted with a braking device in accordance with the invention, and FIGURE 2, which is an enlarged, fragmentary, cross-sectional view taken on line 2—2 of FIGURE 1, showing the free-wheel mechanism and the parts of the device associated therewith.

As can be seen in the figure, the winch comprises a drum 1, the shaft 2 of which is supported by a frame composed of two end-plates 3 which are fixed on a base-plate 4. Distance pieces such as the member 5 ensure the position-maintenance and spacing of the end-plates 3. The shaft 2 is coupled to a unit comprising a motor 6 and reduction-gear 7 by means of an electro-magnetic clutch 8 of conventional type.

The winch, which can be assumed in this figure to be located at the top portion of an atomic reactor which has not been illustrated in the drawings, is intended to bring an absorber element 9 to a well-defined level in the core of the reactor so as to ensure with maximum effectiveness that the fission reaction is stopped in the event of exceptional increase in reactivity. To this end, a flexible tie 10 having a coefficient of elasticity which is as low as possible, joins the absorber element 9 to the drum 1 at each of its extremities which are rigidly fixed to these two members by means of screws 11. There is chosen for the purpose of constituting the tie 10 a metallic strip which is designed to wind into the groove 12 formed at the periphery of the drum. This latter is additionally fitted with a pin 13 which is disposed parallel to the shaft 2 and which is intended during its displacement to actuate a lever 14. This latter is freely mounted on the shaft 2 by means of a ball-bearing 15, for example. Furthermore, as it moves in one direction (counterclockwise as shown in the drawing) around the shaft, the lever 14 drives a cylindrical housing 16 in the interior of which is mounted a free-wheel mechanism 23 of any conventional construction. Free-wheel mechanisms are equally well known as one-way clutch mechanisms or overrunning clutch mechanisms and are employed between two members to automatically connect the members together for simultaneous rotation in the same direction or to permit one of the members to free-wheel or overrun the other member. For illustrative purposes only, a sprag type one-way clutch, such as that disclosed in Patent 2,555,484, is shown connecting the lever 14 and the housing 16. The hub 25 of the lever 14 includes a cylindrical extension 27 disposed in a counterbore 29 formed in the outer end of the housing 16. The outer surface 31 of the extension 27 and the inner wall 33 of the counterbore 29 are concentric, and the free-wheel mechanism 23 mounted therebetween comprises a series of equally spaced sprags 35, slightly longer than the distance between the surface 31 and the wall 33 and connected together by a body of "neoprene" 37 or similar material vulcanized thereto. The arcuate end surfaces 39 of the sprags 35 are biased into frictional engagement with the surface 31 and the wall 33 by the "neoprene" 37, as described in Patent 2,555,484, providing a free-wheel mechanism disposed between the lever 14 and the housing 16. An elastic coupling provided by means of a blade-spring 17 wound in a coil connects the housing 16 to an inertia flywheel constituted by a felloe 18 which is supported at the sides thereof by two end-shields 19 and 20 mounted to rotate freely and respectively on the housing 16 and the shaft 2. Finally, there is fixed in position on the baseplate 4 a mechanical stop 21 which is illustrated diagrammatically in the figure and the function of which will be explained below.

The operation of the device thereupon takes place as follows: the unit comprising the motor 6 and reduction gear 7 produces through the intermediary of the clutch 8 the rotation of the shaft 2 and, as a consequence, the normal displacements of the absorber element 9 such as for example the slow upward movement thereof, by virtue of the drum 1 and the flexible tie 10. Because of the pin 13 and the cooperating stop 21, the extent of rotary movement of the shaft 2 is limited to slightly less than one revolution.

When it becomes necessary as a result of a sudden variation in reactivity to stop the fission reaction, the rapid return of the element 9 to the bottom position corresponding to the maximum effectiveness thereof is brought about by de-clutching the motor, thereby causing the practically free fall of the element which, being drawn down as a result of its own weight, also actuates the drum 1 through the intermediary of the tie 10.

At a predetermined point of the downward travel of the element, the pin 13 comes into contact with the lever 14 and actuates this latter in its turn. The said lever 14 causes the housing 16 to rotate by means of the free-wheel mechanism, thereby having the effect of tightening the spring 17 and of finally driving the felloe 18. The setting into motion of this inertia flywheel thus provides a means of progressively absorbing the kinetic energy of the drum-and-element system.

The device is then designed in order that the pin 13 may come into contact with the stop 21, at the exact moment when the element 9 is located in its most suitable position. But at this precise moment, taking account of the moment of inertia of the unit comprising the drum 1 and element 9, of the speed of the said unit at the moment when the pin 13 comes into contact with the lever 14, of the starting position of this latter, of the characteristics of the spring 17 and of the moment of inertia of the felloe 18, all the kinetic energy has been transferred to the flywheel, thereby permitting the perfect stopping of the element without any danger of impacts and rebounding.

By virtue of the free-wheel coupling 23 between the lever 14 and the housing 16, the unit comprising the housing 16, spring 17 and flywheel 18 then overruns lever 14 and continues its movement, while the energy thereof can easily be absorbed subsequently by means of a braking device of a conventional type, which has not been illustrated in the drawings. Similarly, there is incorporated with the lever 14 a low-couple restoring system but in the direction opposite to that which is imparted to the lever by the drum-and-element unit in such manner as to return the said lever to a suitable position in order to permit a further operation of the winch. In addition and in accordance with an alternative form, the lever 14 itself can be replaced by a clutch control which rigidly interlocks the drum and the free-wheel mechanism of the housing.

The device in accordance with the present invention thus permits of the very reliable operation of winches or devices of this type, which is particularly well suited to the operation of the safety elements of a nuclear reactor. In particular, it can be made possible to adapt the said device without difficulty to the toothed rack systems usually employed for this purpose.

It will naturally be understood that the invention is in no way limited to the form of embodiment which has been described and illustrated, and which has been given solely by way of example.

What I claim is:

1. A device for the transmission of kinetic energy at the time of instantaneous stopping of a body in motion, comprising: a horizontally disposed shaft supported for rotary movement; a drum rigidly mounted on said shaft for rotation therewith; a nonextensible, flexible tie, fixedly secured at one end thereof to said drum and wound thereon; a body, vertically movable between an elevated and a lowered position, fixedly secured to the other end of said flexible tie; housing means rotatably mounted on said shaft; an inertia flywheel rotatably mounted on said housing; an elastic coupling connecting said housing means and said flywheel limiting relative movement therebetween; a lever rotatably mounted on said shaft for movement between a first and a second position; one-way clutch means connecting said lever and said housing means together for simultaneous rotation in one direction upon rotation of said lever in said one direction from said first to said second position; fixed abutment means rigid with said drum for engaging said lever in said first position and rotating said lever in said one direction from said first to said second position; and a fixed stop cooperating with said fixed abutment means limiting rotation of said drum in said one direction, whereby rapid movement of said body from said elevated position to said lowered position rotates said drum in said one direction to said limit of rotation in said one direction with the kinetic energy of said descending body at the instant when said fixed abutment means contacts said stop being wholly and nonreversibly transmitted to said flywheel.

2. A device in accordance with claim 1, including means for rotating said lever from said second to said first position.

3. A device in accordance with claim 1 in which said elastic coupling consists of a flat, spiral, metal spring attached at the inner end thereof to said housing and at the outer end thereof to said flywheel, said spring being placed under compression upon initial rotation of said housing in said one direction.

4. A device in accordance with claim 1, in which said flywheel consists of a pair of spaced, parallel disks having the same outside diameter and provided with axial aligned openings therein in rotative engagement with said housing; and a felloe extending between said disks adjacent the periphery thereof and rigidly secured thereto.

5. A device in accordance with claim 4 in which said elastic coupling is disposed between said disks and within said felloe.

6. A device in accordance with claim 1, having means for rotating said drum to move said body from said lowered position to said elevated position; said means for rotating said drum including motor means; and a remotely controlled electromagnetic clutch operable to releasably connect said motor means and said drum.

7. A device in accordance with claim 1 in which said body is a neutron absorber element employed as a safety rod in a nuclear reactor.

8. A device in accordance with claim 1 in which said fixed abutment means consists of a pin extending outwardly from said drum.

References Cited by the Examiner

UNITED STATES PATENTS

| | | | |
|---|---|---|---|
| 187,111 | 2/77 | Dutcher | 188—102 |
| 1,637,354 | 8/27 | Rottgardt | 242—99 |
| 2,175,516 | 10/39 | Bugatti | 188—102 |
| 2,637,510 | 5/53 | Gill | 242—107.3 |
| 3,018,240 | 1/62 | Bevilaqua et al. | 176—35 |

FOREIGN PATENTS

| | | |
|---|---|---|
| 806,409 | 12/58 | Great Britain. |
| 822,752 | 10/59 | Great Britain. |

CARL D. QUARFORTH, *Primary Examiner.*

REUBEN EPSTEIN, *Examiner.*